Figure 1:
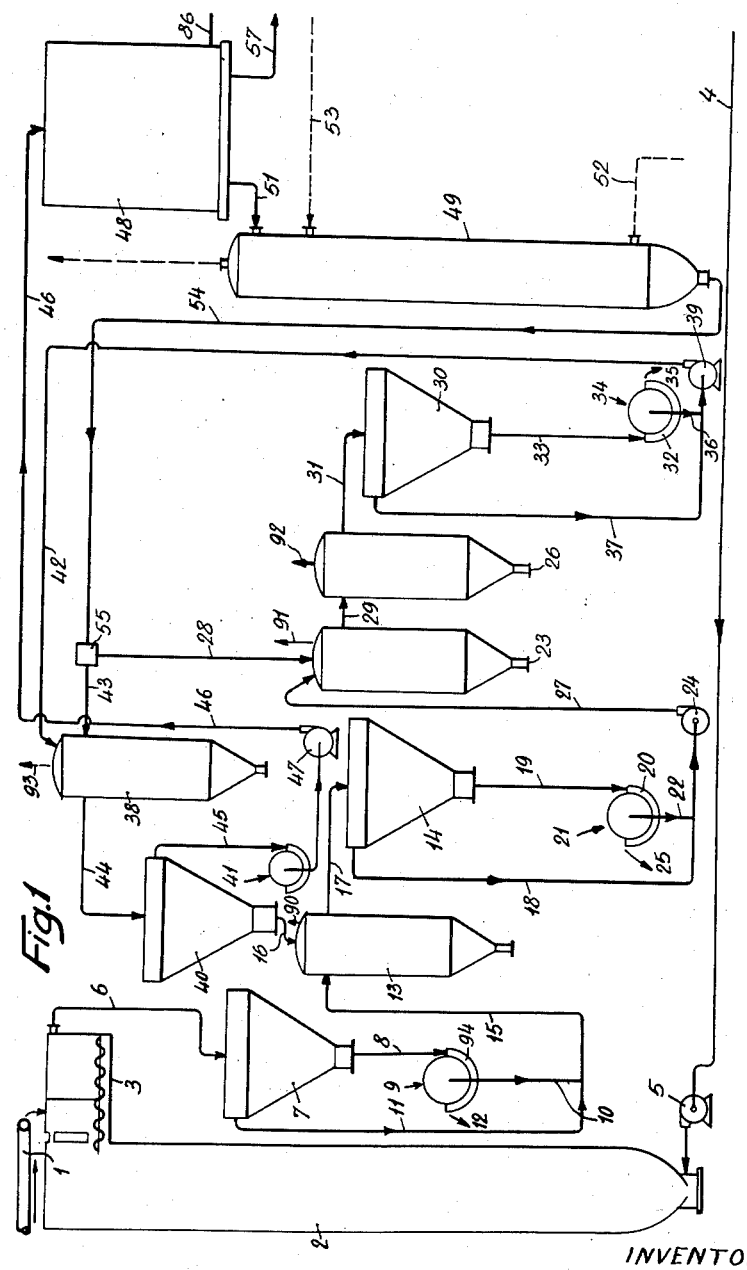

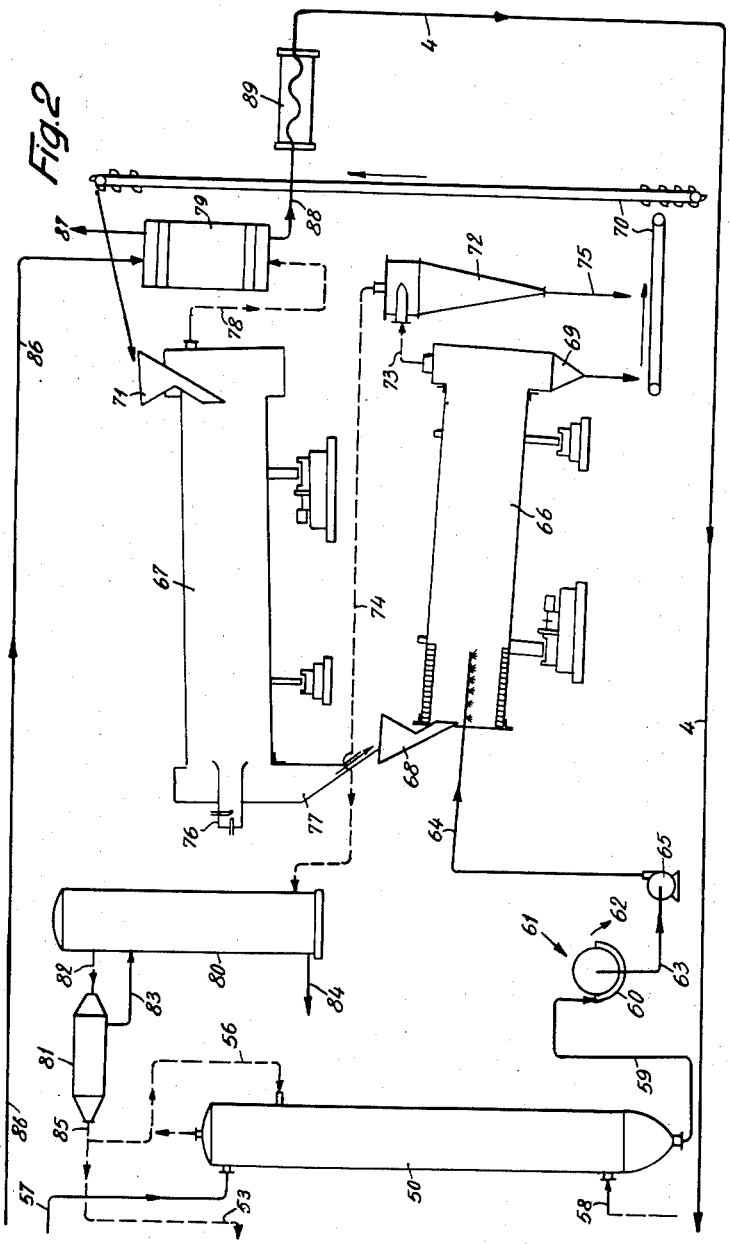

United States Patent Office 2,965,469
Patented Dec. 20, 1960

2,965,469

METHOD OF PRODUCING HIGH-PHOSPHOROUS PRECIPITATED CALCIUM PHOSPHATE

Noël Goulounes, Saint-Cheron, Albert E. Caillat, Bourg-la-Reine, and Christiane Criquillon, Egly-par-Arjajon, France, assignors to Societe d'Applications et de Recherches Industrielles, Rabat, Morocco Filed Feb. 10, 1955, Ser. No. 487,422

Claims priority, application France Feb. 11, 1954

5 Claims. (Cl. 71—39)

This invention relates to the production of precipitated calcium phosphate and has particular reference to a method designed to improve the phosphorous content in the end product. As a rule, the methods of producing precipitated calcium phosphates which are now employed on a commercial scale comprise dissolving of phosphoric acid and subsequent neutralizing this acid, and during this last phase the calcium phosphate is obtained in the form of a precipitate finally recovered according to the usual procedures.

The two essential chemical stages in this process according to the prior art utilize:

In the first stage, a strong acid such as hydrochloric acid, sulfuric acid, nitric acid or the like, which is definitely consumed;

In the second stage, a basic substance (lime, ammonia calcium carbonate, etc.) also definitely consumed.

In these processes according to the prior art, the consumption—in quite substantial quantities—of these acid and basic substances is chiefly responsible for the increase in cost of the phosphorous element in the production of this element from a cheap ore to yield a relatively costly end product.

It is the essential object of this present invention to reduce the high cost during the preparation of the end product by providing a practical and extremely cheap means of recovering nearly all the primary acid and basic substances so that both these substances, except for unavoidable but very moderate losses, may be used over and over indefinitely in the production process.

It is another object of this present invention to make it possible to produce either simultaneously or independently two grades of calcium phosphate, both high-phosphorous, one grade being termed hereafter "agricultural phosphate" for the sake of clarity, and containing, in addition to calcium phosphate the incidental component impurities as they occur in the phosphorous-yielding ore, while the other grade is termed hereafter "pure phosphate" and has had such impurities removed and containing but a very low percentage of impurities, so that it may be used, inter alia, as a nutritive or food complement.

It is an accessory object of this invention to provide as a by-product of calcium phosphate production, calcium carbonate $CO_3Ca$ and carbon dioxide gas $CO_2$ in the form of practically pure substances.

It is an important feature of this invention to carry out the method broadly set forth hereinabove by using the following three essential cyclic stages:

(i) Attacking the phosphate-bearing ore with an acid;
(ii) Precipitating the calcium phosphate with a base (in one or more successive operations);
(iii) Recovering the acid employed in the ore-attacking stage and also recovering the base employed in the precipitation stage.

It will be readily understood by those conversant with the art that each of these stages may also include several operations, as will be made clear in the example described presently, and that even the precipitation stage may be carried out through the indirect action of the base, for instance by employing one or more intermediate substances.

It is another feature of this invention to use on the one hand hydrochloric acid for attacking the ore and, on the other hand, indirectly or directly, ammonia for the neutralization or neutralizations of the phosphoric solutions.

Another feature of this invention consists in employing relatively concentrated solutions for the purpose of recovering the attacking and neutralizing reagents which reduces cost.

By way of indication, the $ClNH_4$ solutions which are obtained and are subsequently used through the decomposition of $ClNH_4$ for recovering the ClH and $NH_3$ employed in the process are concentrated solutions and will titrate preferably from about 20% to 25% of dissolved salt.

By effecting the dicalcium phosphate precipitation in a given solution containing $P_2O_5$, in several successive operations or stages, each followed by the separation of the resulting precipitate, the impurity content in the given solution becomes poorer and poorer as the successive calcium phosphate precipitates obtain an increasingly higher degree of purity. This method of producing calcium phosphate precipitates of progressively increasing purity constitutes another feature of this present invention.

Further, it is a feature of the present invention to eliminate in the form of high-purity calcium carbonate any calcium excess from the initial ore.

Moreover, it is a feature of the present invention to employ a calcium carbonate excess for effecting the practically complete precipitation and recovery of the residual $P_2O_5$ in the solutions subsequent to the last stage of precipitation of calcium phosphate in acid medium.

Another feature of this present invention is the production of non-hygroscopic calcium phosphate characterized by a high phosphoric anhydride content (about 30% to 41%) and high solubility in the usual citric reagents.

Another feature of this present invention is that only the following consumable initial substances are required (save for compensating very small losses): phosphate-bearing ore, fuel and water.

Another feature of this present invention lies in the fact that use is made of high-purity calcium carbonate for precipitating calcium phosphates from the solutions containing the phosphorous compounds, the high degree of purity of this calcium carbonate being due to the fact that it is a by-product produced in the cycle of the process herein described from solutions which have been purified during the precipitations of calcium phosphates which has carried along the impurities.

Another feature of this invention lies in the specific manner of manufacturing calcium carbonate for obtaining calcium phosphate precipitates having good filtering properties; the calcium carbonate for this purpose is prepared from solutions of calcium chloride and ammonium chloride through precipitation by means of ammonia (or ammonia solutions) and carbon dioxide gas, care being taken that the initial phase of the precipitation takes place in a basic medium, the end phase of the precipitation occurring in a substantially neutral or, preferably, slightly acid medium.

Furthermore, this present invention is characterized in that the diluting water to be introduced into the system may advantageously be supplied during the washing of the precipitated products.

Moreover, a feature of the present invention lies in the specific manner in which the ClH acid is recovered from the initial $NH_3$ base. This recovery consists in dissociating into hydrochloric acid and ammonia the ammonium chloride developed from the hydrochloric acid and ammonia employed for attacking the ore and for precipitating the precipitated phosphates respectively, both the acid and the base being recovered upon completion of one given cycle of production; as will appear in the example described hereafter. At this time the acid and base to be recovered will be in the form of ammonium chloride dissolved in water.

A preferred method of recovering these substances consists in causing the ammonium chloride solution to contact magnesium oxide (either pure or in admixture with other substances). This contact magnesia causes the ammonia to be released, whereas the hydrochloric acid becomes fixed on the magnesia. Then, by simply heating the so reacted magnesia compound in a neutral or reducing atmosphere to a temperature in excess of 930° F., in the presence of water vapor, the hydrochloric acid itself will be released and recovered as it passes to the gaseous phase. ClH and $NH_3$ are dissolved in appropriate liquors employed in this process according to known techniques, preferably the so-called "adiabatic" dissolution with a subsequent cooling step for the hydrochloric acid, and the technique which consists in dissolving the substance after rectifying it in the case of ammonia.

In order to afford a clearer understanding of the present invention, one form of embodiment thereof will be described hereafter with reference to the accompanying drawings, wherein:

Figure 1 is a schematic view showing one portion of the installation for producing precipitated phosphates and exhausting the $P_2O_5$ solution according to the present invention, and Figure 2 illustrates the complementary portion of same installation for recovering the acid and base employed in the treatment according to the present invention.

These figures should be considered connected together as a single diagram and side-by-side, Figure 2 being placed on the right-hand side of Figure 1.

Referring to the drawings, the plant according to the present invention comprises a further ore-supplying unit for handling the phosphate-bearing ore, which may be naturally occurring calcium phosphate, or phosphate rock containing $P_2O_5$, which is shown diagrammatically in the form of a conveyor 1.

Another second unit is provided for attacking the phosphate-bearing ore and is shown diagrammatically in the form of a dense-phase attacking column 2 followed by a decanter 3. In the column 2 the acid such as hydrochloric acid, and the phosphate ore are circulated in counterflow relationship to afford a thorough, dense-phase attack, that is, a solid mass in suspension with a high density in a reduced quantity of liquid carrier which is just sufficient to keep the whole mass fluid. As the ore from the conveyor 1 is fed to the top portion of the column 2 the latter is supplied through its base with the acid liquor as hydrochloric acid which may also include ammonium chloride and calcium chloride, from a duct 4 in which a pump 5 is inserted. After such attack and a rough decantation, the residue of the attacking fluid is discharged through the duct 6. At this phase of the operation the residue of the attacking fluid is substantially free of free hydrochloric acid. It contains in solution nearly all the $P_2O_5$ from the ore and, in suspension, fine particles of inert substance (silica, alumina, fluorides, etc.). This solid substance in suspension has a low $P_2O_5$ content.

A third unit is provided for clarifying the residue of the attacking fluid. This clarifying unit is shown diagrammatically in the form of a decanter 7 and a filter 94 with necessary connecting piping system. The decanter 7 is supplied from a duct 6 with the residual fluid to be clarified and delivers clear solution from its top through duct 11. The solid suspension is fed through a duct 8 to the filter 94 and the wash-water is supplied through a duct 9. The filtered liquor and the washings from filter 94 are directed to the duct 11 from the top of decanter 7 through another duct 10. The inert solid material from the washing step in filter 94 is discharged through a duct 12 as a waste product.

A fourth unit is provided for preparing the "agricultural" phosphate which still contains certain of the impurities as they occur in the ore. It comprises a reaction vessel 13 followed by a decanter 14 and adapted to receive on the one hand the clarified residue of the attacking solution containing phosphorous in acid solution from a duct 15 and on the other hand a suspension of neutralizing solid particles consisting in large part of calcium carbonate supplied through a duct 16. In this reaction vessel one portion of the $P_2O_5$ solution precipitates, while the whole of the relatively small amount of calcium carbonate present is consumed during this reaction. The excess $P_2O_5$ in this reaction vessel 13 remains in solution. This solution contains calcium phosphate in suspension consisting mainly of dicalcium phosphate contaminated with various impurities from the attacking-liquor clarifying unit 7, 9. This phosphorous precipitate is fed to the decanter 14 through a duct 17 in water which may also contain ammonium chloride and calcium chloride and an amount of unreacted unprecipitated phosphorous compound. From this decanter 14 are discharged on the one hand through a duct 18 the clear solution containing the non-precipitated $P_2O_5$ and, on the other hand the precipitate itself which is directed through the duct 19 to a filtering and washing apparatus 20 supplied with wash-water from another duct 21. From this filtering and washing apparatus are delivered on the one hand the filtering and washing liquids which flow through a duct 22 to the reaction precipitation vessel 23 for the preparation of a very pure grade of phosphate with the assistance of a pump 24, and on the other hand the "agricultural" phosphate of comparatively low purity through a duct shown diagrammatically by the arrow 25.

A fifth unit is also provided for preparing "pure" phosphate having very low impurity content and suitable for nutritive purposes. This preparation unit comprises two reaction vessels 23 and 26. The first reaction vessel 23 is fed on the one hand through a duct 27 with the acid solution containing $P_2O_5$, and on the other hand through a duct 28 with a calcium carbonate suspension. In this reaction vessel 23 nearly all the $P_2O_5$ acid in the solution is neutralized to produce, by means of calcium carbonate in slight deficiency, a calcium phosphate precipitate consisting of practically pure dicalcium phosphate. The reaction products are discharged from the first reaction vessel 23 through a duct 29 in the form of suspension and are fed to the following second reaction vessel 26 in which the reaction described with reference to the preceding vessel 23 is continued and brought to completion. In this second reaction vessel 26 the calcium phosphate suspension is discharged through a duct 31 to the decanter 30. This suspension may also include ammonium chloride and calcium chloride and a small amount of unprecipitated phosphorous compound still in the solution. The solid substance in suspension is discharged through a duct 33 to a filtering and washing apparatus 32 supplied with wash-water through a duct 34. The filtered and washed precipitate is discharged from 32 as indicated by the arrow 35, and the filtering and washing liquids are discharged through the duct 36. The clear solution from the top of decanter 30 is added through the duct 37 to the remaining filtering liquid delivered from filter 32 and they are together fed to the exhausting vessel 38 through a pump 39 and duct 42. The liquid flowing through duct 42 contains a certain small residual amount of phosphorous in solution.

A sixth unit is also provided for thoroughly exhausting the $P_2O_5$ from residual solution. This unit comprises a reaction vessel 38, a decanter 40 and a filtering apparatus 41. The reaction vessel 38 is fed on the one hand through a duct 42 with the solution containing a low percentage of $P_2O_5$ to be exhausted, and on the other hand through a duct 43 with a large excess of calcium carbonate suspension. In this vessel 38, the residual $P_2O_5$ in the solution from duct 42 is precipitated completely through the reaction with the large-excess of calcium carbonate. The residual solution from which the $P_2O_5$ compound has been so exhausted and containing in suspension calcium carbonate and calcium phosphate is discharged through a duct 44 to a decanter 40. This decanter 40 discharges on the one hand through the duct 16 the solid substance including calcium carbonate and calcium phosphate and on the other hand through a duct 45 the clear solution. This clear solution still containing very moderate quantities of solid materials in suspension is directed through the aforesaid duct 45 to the filtering apparatus 41. The filtered product from 41 contains calcium chloride and ammonia is forced by a pump 47 through another duct 46 to the calcium carbonate preparation unit, on the one hand by ducts 51 and 57, and to the hydrochloric acid dissolving unit, on the other hand, by duct 86 through a distributing vessel 48.

A seventh unit is provided for precipitating the calcium carbonate from the filtrate from 38 and 40 through 41. This unit comprises two carbonating columns 49, 50. The former column 49 (Figure 1) is fed on the one hand with one portion of the residual solution from the thoroughly exhausting unit through a duct 51 connected to a distributing vessel 48, and on the other hand with carbon dioxide gas from a duct 52 at a lower level, and furthermore with ammonia gas through a duct 53. In this carbonation column 49 the solution containing calcium chloride 38, 40, 41, is first fed with ammonia gas, which it dissolves, and is subsequently caused to react at a lower level with the carbon dioxide gas causing the calcium carbonate to precipitate until the medium becomes neutral or slightly acid. Upon completion of the reaction, calcium chloride should still be present in the solution; consequently a deficiency of the ammonia previously introduced into this vessel should be observed. The calcium carbonate suspension is discharged through the duct 54 to the exhausting reaction vessel 38 and also to the pure phosphate reaction vessel 23 through the medium of a distributing valve 55 which controls the distribution through 23 and 38 and hence the relative amount of agricultural phosphate and pure phosphate produced. The suspension passing through duct 54 may also contain ammonium chloride and calcium chloride. The heat developed by the reaction in the column 49 is dissipated by adequate cooling means (not shown).

The carbonation column 50 illustrated in Figure 2 operates in the same way as the carbonation column 49, except that the supply of $NH_3$ through the duct 56 should be made with a certain excess as the liquor must not contain calcium chloride after the reaction; this column 50 is fed with solution from 38, 40, 41, through vessel 48 through a duct 57 and with $CO_2$ through another duct 58. The calcium carbonate suspension with other products produced in column 50 including ammonium chloride is discharged through a duct 59 supplying a filtering and washing apparatus 60 to which is delivered wash-water through a duct 61, the solid particles of calcium carbonate being discharged as indicated by the arrow 62 while the filtering and washing liquor from filter 60 consisting of the ammonium chloride dissolved in water is discharged through a duct 63.

The installation is completed by an eighth unit for treating and dissociating the ammonium chloride liquor delivered from the filter 60.

For the purpose of recovering the hydrochloric acid ClH and ammonia $NH_3$ contained in this liquor from filter 60 in the form of ammonium chloride, the corresponding treating unit comprises a first ammonia kiln 66 in which ammoniacal vapors are released, a second calcination kiln 67 for releasing the hydrochloric acid, a column 80 for rectifying the ammoniacal vapors and a column 79 for absorbing the hydrochloric acid vapors; these various elements are described hereafter.

The first ammonia kiln 66 is fed on the one hand with magnesia at a temperature of about 1,200° F. from a supply hopper 68 and on the other hand with ammonium chloride solution from the filter 60, by means of a pump 65 and a duct 64. In this first kiln 66 the solution liquor filtered from filter 60 is evaporated and the ammonium chloride therein is reacted with the magnesia according to the reaction

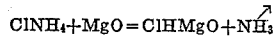

The magnesia, after having fixed in this kiln the hydrochloric acid from the ammonium chloride, is discharged in solid form as ClHMgO through the funnel 69, conveyor 70 and charging funnel 71 into the calcination kiln 67. The ammoniacal vapors consisting of water vapor and ammonia gas are directed through duct 73 to a dust extracting apparatus 72 and then through the duct 74 to the column 80 for rectifying the ammoniacal vapors. The solid particles collected in the dust extractor 72 are discharged through a duct 75 onto the conveyor 70.

The second calcination kiln 67 is supplied with the reacted magnesia compound as it has been reacted in first kiln 66, as already explained. On the other hand, this second calcination kiln 67 is fed with the hot combustion gases from a burner 76 which produces a neutral atmosphere with water steam and carbon dioxide. In this kiln 67 the solid material is heated to a temperature of about 1,200° F. to produce the following dissociation reaction

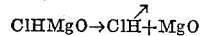

The heating gases present in kiln 67 should contain a certain amount of water steam as the above reaction occurs only in the presence of water steam. Besides, these gases should not be oxidizing. To this end, a slight deficiency of oxygen is maintained in the kiln 67. The combustion gases in kiln 67 which have become loaded with hydrochloric acid as a result of the reaction in the calcination kiln 67 are discharged through the duct 78 to the column 79 in which the hydrochloric acid undergoes an adiabatic absorption. After calcination has been completed, the solid material consisting essentially of magnesia is discharged through the channel 77 into the charging hopper 68 of the other kiln 66.

The rectifying column 80 in which the ammoniacal vapors are rectified is fed with a water-vapor and ammonia mixture from the dust extractor 72 derived from kiln 66. This column 80 is associated with a condenser 81 supplied through a duct 82 with the vapors issuing from the column 80 and adapted to return the condensate through the duct 83 to the column 80. A duct 84 discharges the liquid water which has been condensed from the bottom of column 80, and another duct 85 discharges the concentrated ammoniacal vapors from the condenser 81.

The absorption column 79 for the hydrochloric acid vapors is of the adiabatic type and fed on the one hand, through the duct 78, with hydrochloric acid vapors from calcination kiln 67, and on the other hand, through the duct 86, with the liquor from the filter 41 containing largely calcium chloride through the medium of the distributing vessel 48. The non-condensable gases and water vapor are discharged through the duct 87 from this column 79, and on the other hand the hot hydrochloric acid solution is discharged through the duct 88. This solution is subsequently passed through a cooling apparatus 89 before flowing through the duct 4 to the phosphate attacking unit as cooled hydrochloric acid with ammonium chloride and calcium chloride.

Now the carbon dioxide cycle will be briefly described. The reaction vessels 13, 23, 26 and 38 release through the connecting ducts 90, 91, 92, 93 pure carbon dioxide in gaseous form. The carbon dioxide gas so released may be recovered and advantageously used to contribute in supplying the carbonating columns 49 and 50. However, the quantity of carbon dioxide gas thus recovered would be insufficient to provide an adequate supply for these columns; therefore, the complemental $CO_2$ required is derived from the combustion gases which may originally be from burner 76 and which may be advantageously extracted from the adiabatic absorption column 79 for the hydrochloric acid, after the water vapor contained in these gases has been cooled and condensed. The recovered carbon dioxide gas from the vessels 13, 23, 26 and 38 may be also utilized either partly or completely for other purposes outside the process of this present invention.

The form of embodiment described hereinabove, due to the substantial economy afforded by this method, is concerned chiefly with the production, upon supplying the ammoniacal-vapor releasing kiln, of a liquor having the highest possible ammonium chloride content so as to keep the recovery of hydrochloric acid and ammonia to an extremely high percent to maintain replacement of low cost. In this specific form of embodiment the ammonium chloride concentration is about 20% to 25%. The rate of conversion of $P_2O_5$ in the ore into soluble $P_2O_5$ compound in the ammonia citrate ultimately produced is very high.

Of course, many substantial modifications may be brought to this embodiment without departing from the spirit and scope of the present invention. Thus, more particularly, other methods than those herein specifically described could be resorted to for recovering the hydrochloric acid and ammonia from ammonium chloride solutions.

The raw phosphate ore may also be attacked by using the acid solution, according to any suitable technique.

The dicalcium phosphate may be precipitated in a single phase or in more than two phases, with or without purifying the attacking liquors beforehand.

In the recovery of the hydrochloric acid, the latter may be dissolved in a liquor of other origin than that indicated hereinabove, particularly and advantageously from the various washings of the precipitates. The apparatus for carrying out the various reactions of this process are given only by way of example, as any other installations and means having substantially similar functions may also be employed.

Finally, the various operations accomplished in the application of the method of this present invention have been described schematically hereinabove in order to supply those skilled in the art with the information required for carrying out this method.

In order to illustrate the example described herein, detailed figures are given herebelow with respect to the liquid outputs or suspensions circulated in some ducts, as well as their concentrations of dissolved salts or solid particles in suspension. The figures relate to the attack of 1 short ton per hour of phosphate-bearing ore having a $P_2O_5$ content of 34% by weight.

Duct 4: Hourly circulation and composition of liquid therein:

| | Lbs. |
|---|---|
| Water | 10,800 |
| ClH | 996 |
| $ClNH_4$ | 1,952 |
| $Cl_2Ca$ | 2,548 |

The acid content is about 10% higher than the theoretical quantity required for converting the $P_2O_5$ in the phosphate-bearing ore into monocalcium phosphate.

Duct 17: Hourly circulation and composition of suspension therein:

| | Lbs. |
|---|---|
| Water | 12,372 |
| Precipitated phosphate | 848 |
| $Cl_2Ca$ | 4,348 |
| $ClNH_4$ | 2,169 |

$P_2O_5$ in solution.

The $P_2O_5$ compound in solution corresponds to the precipitation of phosphate during the subsequent stages of the process.

Duct 31:

| | Lbs. |
|---|---|
| Water | 15,562 |
| Precipitated phosphate | 848 |
| $Cl_2Ca$ | 4,458 |
| $ClNH_4$ | 2,712 |

Residual $P_2O_5$ in the solution.

Duct 46:

| | Lbs. |
|---|---|
| Water | 18,372 |
| $ClNH_4$ | 3,320 |
| $Cl_2Ca$ | 4,338 |

This last-mentioned solution is directed to the distributing vat 48 and divided therein into three fractions, namely:

(i) A first fraction corresponding to 11,900 lbs. of water utilized for effecting the ClH absorption;

(ii) A second fraction corresponding to 4,400 lbs. of water utilized for precipitating the calcium carbonate in the carbonating column 49; and (iii) A third fraction corresponding to 3,930 lbs. of water utilized for precipitating calcium carbonate in the carbonation column 50. From the carbonation column 49 this fraction is discharged through the duct 54, this suspension having the following composition:

| | Lbs. |
|---|---|
| $CO_3Ca$ | 603 |
| $ClNH_4$ | 1,369 |
| $Cl_2Ca$ | 276 |
| Water | 4,000 |

The relative proportions with which the "agricultural" phosphate and "pure" phosphate are obtained are governed by the distribution of this suspension from column 49 to its two utilizing elements 13 and 23 through distributing valve 55.

The suspension having the following composition is discharged through the duct 59 from the second carbonation column 50.

| | Lbs. |
|---|---|
| $CO_3Ca$ | 764 |
| $ClNH_4$ | 1,461 |
| Water | 3,572 |

Duct 64: The liquid circulating therethrough has the following composition:

| | Lbs. |
|---|---|
| Water | 5,000 |
| $ClNH_4$ | 1,461 |

It will be apparent to those skilled in the art that modifications may be made in the apparatus and method here disclosed according to procedures known in the art without essentially changing the present invention, and all such modifications which are within the scope of the appended claims we consider to be comprehended within the spirit of our invention.

We claim:

1. A process for preparing precipitated calcium phosphate from natural raw phosphate ore, comprising treatment of said ore by a sufficient quantity of hydrochloric acid for dissolving into aqueous solution the phosphoric anhydride of the ore, neutralizing said aqueous solution so obtained by means of calcium carbonate for precipitating calcium phosphate, the separation of the so precipitated calcium phosphate, the treatment of the remaining solution containing the calcium excess as calcium chloride by ammonia and carbon dioxide for converting calcium chloride into precipitated calcium carbonate and ammonium chloride, separating the so formed precipitated calcium carbonate, a part of which is used for said neutralizing in such a manner that the neutralizing agent does not introduce any external impurity through the process, and the decomposition of the ammonium chloride into hydrochloric acid and ammonia which are thus recovered and used again in a closed cycle for the above treatment.

2. A process for preparing precipitated calcium phosphate as claimed in claim 1 in which the calcium carbonate for precipitating calcium phosphate is introduced in two successive phases, in the first of which the quantity of calcium carbonate used is lower than the theoretically necessary quantity whereas in the second phase the quantity of calcium carbonate used is larger than the theoretically necessary quantity, the solids precipitated during the second phase of precipitation being precipitated, then introduced again as a neutralizing agent in the first phase of precipitation, in such a manner that the solids which are precipitated in the first phase are free from calcium carbonate whereas the solution which results from the second phase does no more contain phosphoric anhydride.

3. A process for preparing precipitated phosphates from natural raw phosphate ore, said process consisting of the successive steps of operations of treatment, in aqueous solution, of phosphate ore with hydrochloric acid to dissolve the phosphoric content thereof, precipitation by calcium carbonate of phosphoric components resulting from said ore treatment with acid, separation of the so-obtained precipitated calcium phosphates out of said aqueous solution in which remains dissolved calcium chloride, treatment of said aqueous solution containing calcium chloride with ammonia and carbon dioxide in sufficient quantities to obtain an ammonium chloride solution and precipitated calcium carbonate by conversion of all the calcium chloride present, separation of said so precipitated calcium carbonate, decomposition of said ammonium chloride so obtained by heating to recover acid and ammonia, and re-cycling of said hydrochloric acid and ammonia which are used again in both preceding sets of operations of the treatment of ore with acid and the treatment of calcium chloride with ammonia.

4. A process for preparing precipitated calcium phosphate as claimed in claim 3, in which the calcium carbonate for precipitating calcium phosphate is introduced in two successive phases, in the first of which the quantity of calcium carbonate used is lower than the theoretically necessary quantity whereas in the second phase the quantity of calcium carbonate used is larger than the theoretically necessary quantity, the solids precipitated during the second phase of precipitation being separated, then introduced again as a neutralizing agent in the first phase of precipitation, in such a manner that the solids which are precipitated in the first phase are free from calcium carbonate whereas the solution which results from the second phase contains no more phosphoric anhydride.

5. A process for preparing precipitated phosphates from natural raw phosphate ore, said process consisting of the successive steps of operations of treatment, in aqueous solution, of phosphate ore with hydrochloric acid to dissolve the phosphoric content thereof, precipitation by calcium carbonate of phosphoric components resulting from said ore treatment with acid, separation of the so-obtained precipitated calcium phosphate out of said aqueous solution in which remains dissolved calcium chloride, treatment of said aqueous solution containing calcium chloride with ammonia and carbon dioxide in sufficient quantities to obtain an ammonium chloride solution and precipitated calcium carbonate by conversion of all the calcium chloride present, separation of said so precipitated calcium carbonate, decomposition of said ammonium chloride so obtained by heating to recover acid and ammonia, by reacting in a first chamber magnesium oxide with ammonium chloride, this first chamber being fed with ammonium chloride solution and hot magnesium oxide at a temperature of about 1200° F., ammonia gas bearing the ammonium values from the said ammonium chloride leaving the said first chamber and the hydrochloric values being bound to the magnesium oxide in the said chamber and leaving the said chamber with the said magnesium oxide, and the step of reacting in a heated second chamber at a temperature of about 1200° F., the magnesium oxide leaving the said first chamber with combustion gases containing water vapor, this said second chamber being fed with magnesium oxide, to which are bound the hydrochloric values as previously said and with combustion gases containing water vapor, the hydrochloric values from the said ammonium chloride leaving the said second chamber as hydrogen chloride gas, the so reacted magnesium oxide leaving this said second chamber at a temperature of about 1200° F., to be introduced into the said first chamber.

References Cited in the file of this patent

UNITED STATES PATENTS

| | | |
|---|---|---|
| 1,718,420 | Kessler | June 25, 1929 |
| 1,753,478 | Pike | Apr. 8, 1930 |
| 1,930,744 | Durepaire et al. | Oct. 17, 1933 |
| 1,969,951 | Seyfried | Aug. 14, 1934 |
| 2,053,432 | Harvey | Sept. 8, 1936 |
| 2,312,047 | Ogburn | Feb. 23, 1943 |

FOREIGN PATENTS

| | | |
|---|---|---|
| 1,137 | Great Britain | Apr. 19, 1870 |
| 4,007 | Great Britain | Dec. 5, 1873 |
| 283,558 | Great Britain | July 26, 1928 |